July 10, 1928.  
W. SCHWEMLEIN  
BEARING  
Filed July 1, 1927
1,676,292
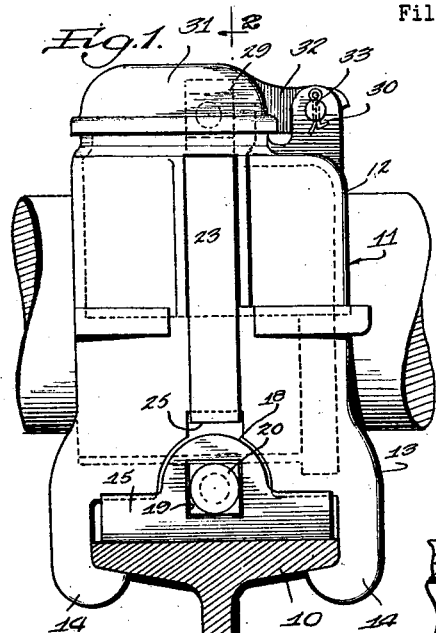
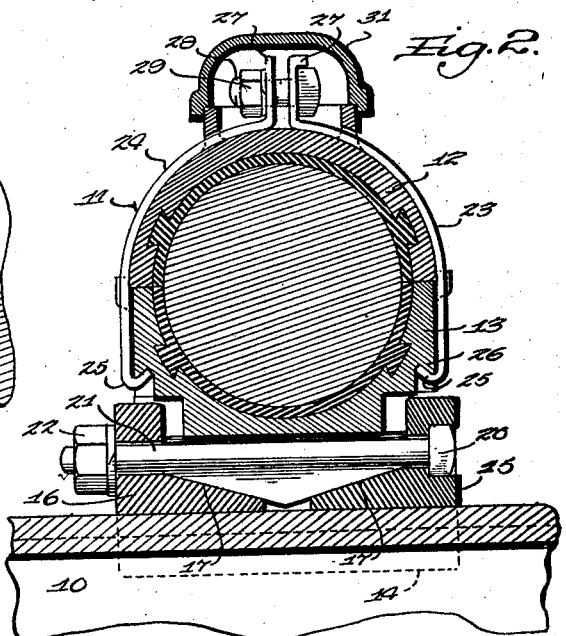
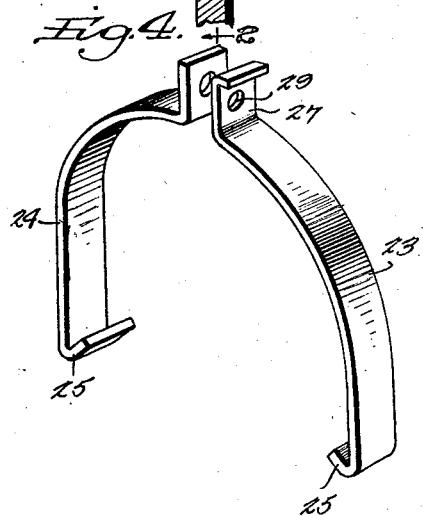
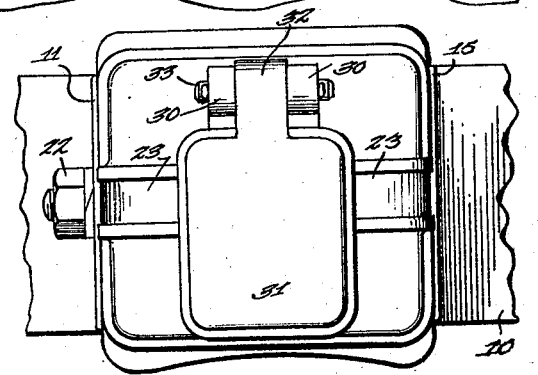
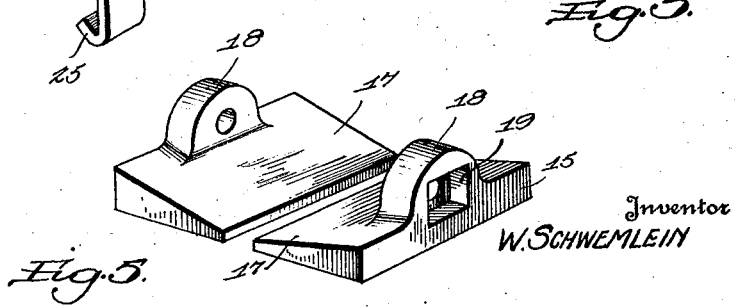
Inventor  
W. SCHWEMLEIN  
By  
Attorney Patented July 10, 1928.

1,676,292

UNITED STATES PATENT OFFICE.

WILLIAM SCHWEMLEIN, OF PARKERSBURG, WEST VIRGINIA, ASSIGNOR TO THE PARKERSBURG RIG AND REEL COMPANY, OF PARKERSBURG, WEST VIRGINIA, A CORPORATION OF WEST VIRGINIA.

BEARING.

Application filed July 1, 1927. Serial No. 202,952.

This invention relates to a bearing which can be easily and quickly adjusted in place on the supporting structure.

The object of the invention is to provide a bearing of minimum length that can be adjusted to any desired position along an I-beam or other supporting structure without the necessity of drilling holes or milling notches in the supporting structure.

In the preferred embodiment of my invention the bearing consists of an upper and lower segment joined together by clamp straps and having projecting arms extending from one of the segments and adapted to embrace the supporting structure. It also includes wedges which are inserted between the supporting structure and the bottom of the lower segments, which wedges can be adjusted in order to clamp the bearing in place on the supporting structure at any desired position.

In the drawings wherein I have shown the preferred embodiment of the invention,

Figure 1 is a side elevation of the bearing and supporting structure,

Figure 2 is a cross section on line 2—2 of Figure 1,

Figure 3 is a top plan view,

Figure 4 is a perspective view of the clamp straps, and,

Figure 5 is a perspective view of the wedges.

In the drawings, the numeral 10 designates an I-beam used as a supporting structure for the bearing designated generally by numeral 11. The bearing comprises an upper segment 12 and lower segment 13. Projecting from the lower segment 13 and extending beneath the I-beam 10 are arms 14. Inserted between the top of the I-beam and the bottom of the lower segment 13 are two wedges 15 and 16. These wedges are shown more particularly in Figure 5 and comprise a tapered portion 17 and an upright boss 18. Holes are formed through the bosses and sockets 19 are formed to receive the head 20 of bolt 21 which connects the two wedges. A nut 22 is screwed on to the opposite end of bolt 21 so that by turning the nut, wedges 15 and 16 may be adjusted inwardly or outwardly thereby raising or lowering the bearing into or out of engagement with I-beam 10. Clamp straps 23 and 24 having bent lower ends 25 are inserted under projections 26 of the lower segment 13. These clamp straps extend upwardly surrounding the upper segment 12 and are formed with upright flanges 27. A bolt 28 extending through holes 29 in the flanges 27 holds the clamp straps together. Both the upper and lower segments are lined with babbitt metal which is held in place by the usual dove-tailed grooves.

Extending upwardly from the upper segment 12 are ears 30. A lid 31 having an extending portion 32 is pivotally connected between ears 30 by means of a pin 33. This lid 31 acts as a protecting means for the upwardly extending flanges of the clamp straps and also for the bolt 28 and nut 29 which hold the clamp straps in place.

It will be seen that by the above described arrangement, when it is desired to move the bearing along on its supporting structure it is only necessary to loosen bolt 21 by unscrewing nut 22. The wedges may then be drawn outwardly thus allowing the bearing to lower and the arms 14 to withdraw out of contact with the under face of I-beam 10. The bearing may then be moved along to any desired position and clamped in place by simply tightening nut 22.

It will be understood by the above described apparatus that I have provided a simple adjustable bearing that may be readily moved into any desired position and thereafter rigidly clamped to its supporting structure.

Although I have set forth the preferred embodiment of my invention it will be apparent that changes may be made in the size, shape and arrangement of parts without departing from the spirit of the invention or the scope of the subjoined claims.

Having described my invention, I claim:

1. A bearing comprising an upper segment and a lower segment, arms extending from the lower segment and adapted to engage a bearing support, and wedges inserted between said support and said bottom segment.

2. A bearing comprising an upper segment and a lower segment, clamp straps engaging said upper and lower segments, arms extending from the lower segment and adapted to engage a bearing support, and wedges inserted between said support and said bottom segment.

3. A bearing comprising an upper segment and a lower segment, clamp straps engaging projections on said lower segment and extending around said upper segment, fastening means engaging said clamp straps adjacent their upper ends, arms extending from the lower segment and adapted to engage a bearing support, and wedges inserted between said support and said bottom segment.

4. A bearing comprising an upper segment and a lower segment, clamp straps engaging projections on said lower segment and extending around said upper segment, fastening means engaging said clamp straps adjacent their upper ends, a lid protecting said fastening means, arms extending from the lower segment and adapted to engage a bearing support, and wedges inserted between said support and said bottom segment.

5. A bearing comprising an upper segment and a lower segment, clamp straps engaging projections on said lower segment and extending around said upper segment, fastening means engaging said clamp straps adjacent their upper ends, ears extending from said upper segment, a lid pivotally mounted between said ears and adapted to protect said fastening means, arms extending from the lower segment and adapted to engage a bearing support, and wedges inserted between said support and said bottom segment.

6. A bearing comprising upper and lower segments, clamp straps engaging said segments, arms extending from one of said segments and adapted to engage a bearing support, wedges inserted between said support and said lower segment, and means for adjusting said wedges to clamp said bearing to said support.

7. A bearing comprising upper and lower segments, connecting means for said segments, arms extending from one of said segments and adapted to engage a bearing support, wedges inserted between said support and said lower segment, and a bolt adjustably connecting said wedges.

In testimony whereof I affix my signature.

WILLIAM SCHWEMLEIN.